June 17, 1969 G. B. CONNAN 3,449,832
ARTIFICIAL CERAMIC TOOTH
Filed May 12, 1966

*INVENTOR*
GEORGE BRUCE CONNAN

BY

*ATTORNEY*

United States Patent Office 3,449,832
Patented June 17, 1969

3,449,832
ARTIFICIAL CERAMIC TOOTH
George Bruce Connan, Preston, Victoria, Australia, assignor to The Dentists' Supply Company of New York, York, Pa., a corporation of New York
Filed May 12, 1966, Ser. No. 549,581
Int. Cl. A61c *13/08*
U.S. Cl. 32—8                                    10 Claims

ABSTRACT OF THE DISCLOSURE

A ceramic artificial tooth comprising a relatively opaque inner body portion, a translucent enamel-simulating layer overlying at least the labial surface portion of the body portion, and a band-like area of particles having different light-reflective properties from the adjacent ceramic material extending transversely to the longitudinal axis of the tooth between said body and enamel-simulating layer and positioned intermediately of the upper and lower extremities of the tooth, said layer being formed of material resistant to the normal firing temperatures required to fuse the ceramic portions of said tooth and resembling the pearlescence of natural teeth selected from the class comprising mica and glass-like material.

---

This invention relates to an artificial ceramic tooth and certain procedures for manufacturing the same. More particularly, it is directed to the production of an artificial ceramic tooth which closely simulates natural human teeth, especially in regard to certain aesthetic properties thereof.

Prior U.S. Patent No. 3,218,711, dated Nov. 23, 1965, is in the name of the present applicant and pertains to an artificial tooth formed from synthetic resin, commonly referred to as plastics. The principal construction of the tooth comprising the subject matter of said patent consists of an inner body part, and an enamel-simulating layer or part extending along at least the major portion of the outer, labial or buccal surface portion of the body part. Interposed between the interfaces of said connected and overlying parts is a band or stripe of light-reflecting material of restricted dimension which extends a limited distance in a direction longitudinally of the tooth and also extending transversely of the tooth substantially between the opposite side edges thereof. Said band of light-reflective material is capable of simulating the pearlescent aspects of natural teeth when subjected to incident light.

The band or stripe of light-reflective material described in said aforementioned patent is selected from a group of substances compatible with synthetic resin materials of the type from which said connected and overlying parts of the tooth are formed. Inasmuch as relatively low temperatures are utilized in the manufacture of artificial teeth made from synthetic resin, as compared with firing temperatures for ceramic artificial teeth, the materials from which said light-reflective band or layer is selected for teeth made from synthetic resin are suitable for use at the temperatures employed to manufacture such teeth. However, said materials are not usable for similar purposes in the manufacture of artificial ceramic teeth in which it is desired to incorporate light-reflective materials capable of simulating the pearlescent effect of natural teeth when subjected to incident light.

In seeking to develop an artificial ceramic tooth having such pearlescent-simulating property as was successfully developed in the tooth comprising the subject matter of said prior patent, the present invention resulted from the discovery of several types of material capable of being employed with ceramic materials from which artificial ceramic teeth customarily are formed and especially being capable of withstanding the temperatures normally required for purposes of firing said ceramic materials without disintegrating or otherwise losing any of the discovered ability to reflect incident light in a manner to produce in artificial ceramic teeth a pearlescent effect very closely simulating that which occurs in natural teeth.

It therefore is the principal object of the present invention to provide an artificial ceramic tooth having having light-reflective material disposed inwardly of the outer, labial or buccal surface of the tooth and of restricted area preferably adjacent the incisal or occlusal surface of the tooth and having an index of refraction sufficiently different from the ceramic matrix material surrounding the light-reflective material to be capable of causing partial and irregular reflection and refraction of incident light to simulate the pearlescent effect of a natural tooth of similar size and shape.

It is another object of the invention to provide an artificial ceramic tooth of the type referred to above in which the light-reflective material preferably is in the form of a relatively thin layer interposed between the inner, relatively opaque body portion of the tooth and the relatively translucent enamel-simulating layer or outer part thereof which is integrally connected to the body part, whereby the layer of light-reflective material is securely and effectively enclosed between said two parts of the tooth.

A further object of the invention is to firmly dispose said layer of light-reflective material between the interfaces of said connected tooth parts and said interfaces also being of irregular contour, particularly in a direction transversely to the longitudinal axis of the tooth; said relatively thin layer of light-reflective material also being complementary to said irregular contour of said interfaces of the connected parts of the tooth.

Other objects of the invention comprise variations in the shapes, area extents, and disposition of the light-reflective material disposed between the body part and enamel-simulating part of the type of artificial ceramic tooth referred to above so as to produce various desired optical aesthetic effects incident to producing the desired pearlescent effect provided in said artificial ceramic tooth, details of which are described hereinafter.

Details of the invention and the foregoing objects, as well as other objects thereof, are set forth in the following specification and illustrated in the accompanying drawing comprising a part thereof.

Figure 7:
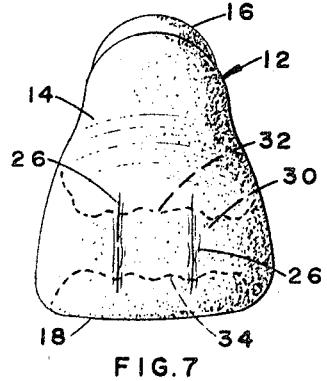
Figure 8:
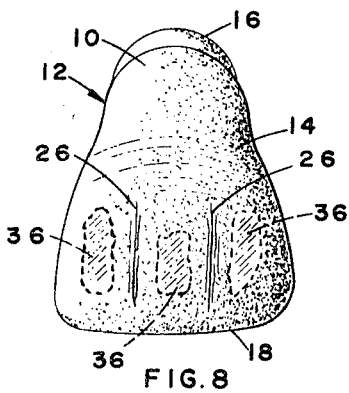
Figure 9:
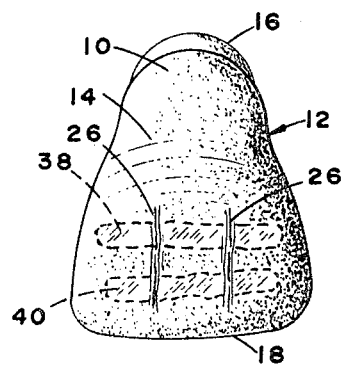

FIGS. 7–9 respectively are front elevations of still further embodiments of exemplary artificial porcelain teeth in which the principles of the present invention are incorporated in different forms.

Figure 10:
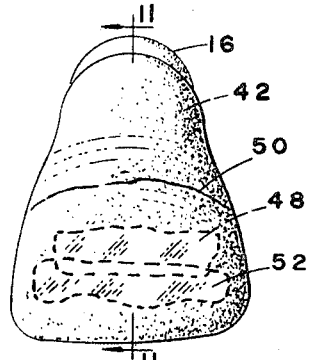

FIG. 10 is a front elevation of still another embodiment of exemplary tooth in which the principles of the present invention are incorporated in a still different form from those illustrated in FIGS. 1, 4 and 7–9.

Figure 11:
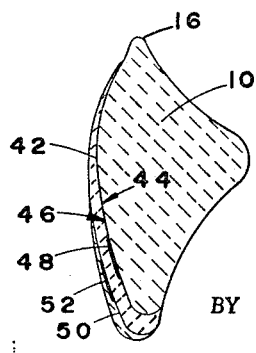

FIG. 11 is a vertical sectional view of the exemplary artificial ceramic tooth shown in FIG. 10 as seen on the line 11—11 of said figure.

Artificial ceramic teeth of the type to which the principles of the present invention are applied are sometimes referred to as porcelain teeth. They may be formed, for example, by first molding a so-called body part 10 of the embodiment of artificial ceramic tooth 12 shown in FIGS 1–3. Body parts 10 of artificial ceramic teeth may, for example, be molded accurately and precisely within mold cavities contained within and between a back mold and a so-called shader mold, neither of which are illustrated herein but both types of which are well known in the ceramic tooth manufacturing art. The material employed usually is a mixture of conventional materials from which artificial ceramic teeth normally are made, such mixture generally including, by way of example and not restriction, a substantial proportion of feldspathic material of predetermined fine sizes, and also lesser proportions of silica, kaolin, pigments and binders. Said ingredients are mixed into a homogeneous plastic consistency, known as "dough" in the artificial ceramic tooth industry. In finished condition, the body part 10 normally is relatively opaque.

In contrast to the body part 10, the enamel-simulating part 14, while also formed of suitable ceramic material of the foregoing types but different proportions than the body part, such as the types normally employed for such parts, is at least partially translucent in completed condition. Initially, a homogenous mixture of plastic consistency is prepared which also conventionally is referred to as "dough." The enamel-simulating parts 14 usually are molded within cavities formed within and between a front mold and a shader mold which are so shaped that the molded part 14 is somewhat shell-like and complementary to the front, labial or buccal surface of the body part 10 and against which surface the enamel-simulating part 14 is disposed so that said part 14 overlies said front surface of part 10 and generally extends substantially from the gingival 16 to the incisal 18 of the tooth. It is to be understood that, for the purposes of this invention, it is immaterial which of the aforementioned tooth parts is formed first.

Figure 1:
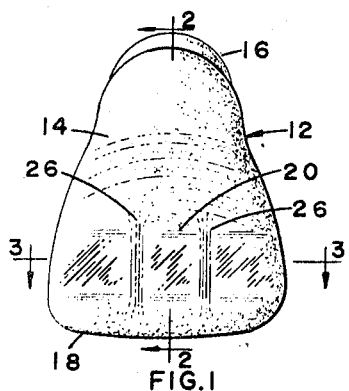
FIG. 1 is a front elevation of one embodiment of an exemplary artificial ceramic tooth in which the principles of the present invention are incorporated.
Figure 2:
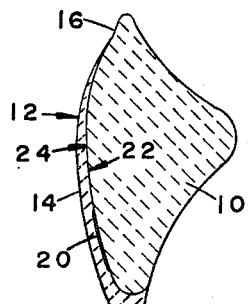
FIG. 2 is a vertical sectional view of the embodiment of exemplary tooth as seen on the line 2—2 of FIG. 1.

The particular illustration of an artificial ceramic tooth selected for showing in FIGS. 1 and 2 actually comprises a front or anterior tooth. A so-called back or posterior tooth, comprising a bicuspid or molar, rather than being provided with a cutting or shearing incisal edge as is provided on an anterior tooth, has what is known as an occlusal surface which is of irregular shape and serves to masticate food as distinguished from cutting or incising it. However, the principles of the present invention are applicable and pertain to posterior teeth as well as anterior teeth.

As indicated in applicant's prior Patent No. 3,218,711, it is known that a natural, human tooth, in the so-called "gingival third" thereof, possesses an aesthetic characteristic or effect which appears to resemble the pearlescent appearance found, for example, in natural pearls, oyster shells, and certain fish scales when incident light is reflected thereby. In the artificial resin teeth comprising the subject matter of applicant's prior patent, a band or stripe of natural or synthetic pearlescent material may be applied to said artificial teeth at the interface between the body and enamel-simulating parts of the artificial synthetic resin teeth. However, such materials can not be used to reflect incident light so as to produce a pearlescent effect in artificial ceramic teeth because said materials decompose and otherwise do not retain said pearlescent appearance after being subjected to the firing temperatures normally used in fusing artificial ceramic teeth incident to completing the manufacturing thereof. Such temperatures, for example, may vary between approximately 2100° F. and 2300° F. These temperature limits are merely illustrative and are not to be regarded as restrictive.

In attempting to produce in artificial ceramic teeth the pearlescent effect found in natural teeth, it was necessary to discover certain materials substantially different from those used in the applicant's prior patent because of the need for the materials to withstand said aforementioned firing temperatures and still be capable of producing a pearlescent effect when incident light is reflected therefrom. After numerous trials and attempts, it has now been found that there are several principal types of materials useful to produce the desired pearlescent effect in artificial ceramic teeth, details of which are as follows.

The several types of material which have been found to be satisfactory for said purposes possess an index of refraction sufficiently different from the ceramic matrix material within which they are enclosed to cause partial reflection and refraction of incident light, in an irregular manner, and thereby simulate the somewhat shimmering and constantly changing pearlescent effect such as that which occurs when observing so-called Mother-of-Pearl material and other similar natural materials mentioned above, especially when changing the position thereof with respect to incident light as viewed by the human eye. Material of this type, as indicated above, is found, for example, in certain types of oyster shells, natural pearls, and certain types of fish scales. The pattern is not fixed especially if the article being observed is moved while being observed, whereby a constantly changing pattern of subtle colors results in a readily observable manner.

One of the materials which has been found satisfactory for use in manufacturing artificial ceramic teeth having desired pearlescent effects is mica. It may be either natural or artificial. Preferably, the mica is in thin sheet form and in accordance with the embodiment of the invention illustrated particularly in FIGS. 1–3, a relatively thin and narrow stripe 20 of mica is disposed within the interfaces between the body part 10 and enamel-simulating part 14 of the tooth 12. It will be seen that the width of the stripe 20, in a direction parallel to the longitudinal axis of the tooth, is substantially less than the entire longitudinal dimension of the tooth. Preferably, the stripe 20 is disposed approximately within the lower third of the tooth as viewed in FIGS. 1 and 2, this being referred to as the so-called "gingival third." Further, the stripe 20, in the embodiment of FIGS. 1 and 3, preferably extends substantially across the entire width of the tooth between the opposite side edges thereof.

The mica in the stripe 20 preferably is not of a continuous nature but, rather, may be composed of a number of pieces of various sizes, some or even most of which may be quite minute but nevertheless the particles and pieces are of platelet character to provide the essential semitranslucent and semireflective properties referred to above. To facilitate the handling and positioning of such particles and pieces of mica, an appropriate vehicle and positioning agent may be used such, for example, as glycerine, or any suitable commercial type banding or lining media.

Such vehicle or positioning agent may be mixed with the material before application, or it may be applied to the desired surface of one of the tooth parts to cover the desired area, and the mica material then may be dusted or otherwise easily applied to the vehicle coating prior to affixing the mating part of the tooth thereover. Conveniently, the mica particles may be applied in the form of a somewhat irregular stripe and thus produce a highly satisfactory type of reflection and refraction of incident light. The arrangement of the pieces and particles also provides a beneficial structural result by permitting abutting areas of the tooth parts to subsequently unite between the spaced pieces and particles of mica and thereby avoid any potential tendency of separation of the tooth parts.

Figure 3:
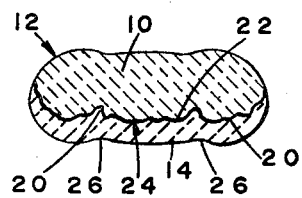
FIG. 3 is a transverse sectional view of said embodiment of exemplary tooth as seen on the line 3—3 of FIG. 1.

Especially to render the reflecting powers of the stripe of mica 20 most capable of simulating the natural pearlescent effect of human teeth, the interface surface 22 of the body part 10 and the corresponding, complementary interface surface 24 of enamel-simulating part 14 are substantially irregular, especially in a transverse direction as readily can be seen from FIG. 3. They also are complementary to each other and, when the relatively thin stripe of mica 20 of the type described above is introduced between the interface surfaces 22 and 24, incident to uniting the body and enamel-simulating parts 10 and 14, said stripe 20 is made to conform faithfully to the irregular but complementary interface surfaces 22 and 24. Prior to firing or fusing said composite tooth comprising overlying body and enamel-simulating parts 10 and 14, the nature of the body and enamel-simulating material is such that it can be at least slightly displaced so as to accommodate the stripe of mica 20 between said interface surfaces without noticeably changing the desired final shape of the tooth.

Particularly in both natural as well as artificial central teeth, a plurality of more or less somewhat parallel but transversely spaced grooves, such as exemplary grooves 26, are formed in the front, labial surface of the anterior tooth 12 illustrated in FIGS. 1–3 and the transverse sectinal view of the tooth shown in FIG. 3 clearly shows such grooves. It should be understood that in the construction of the tooth illustrated in said figures, for simplicity of illustrations, there is only a single layer of enamel-simulating material 14 which comprises the partially translucent labial portion of the tooth through which the reflective effect of the stripe of mica 20 is readily viewable. Such enamel-simulating layer or part 14 also usually comprises the incisal edge 18 of the specifically illustrated anterior artificial ceramic tooth 12 or the occlusal surface of a posterior tooth.

Figure 4:
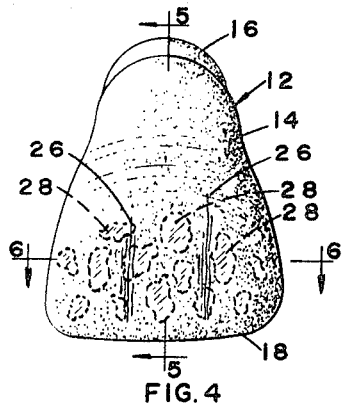
FIG. 4 is a view similar FIG. 1 but illustrating another embodiment of an exemplary artificial tooth in which the principles of the present invention are incorporated in a different form from that shown in FIG. 1.
Figure 5:
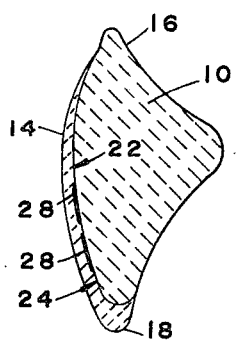
FIG. 5 is a vertical sectional view of said exemplary tooth as seen on the line 5—5 of FIG. 4.
Figure 6:
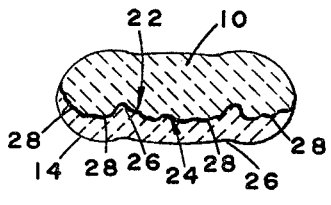
FIG. 6 is a transverse sectional view of said embodiment of exemplary tooth as seen on the line 6—6 of FIG. 4.

As might readily be supposed, the pearlescent effect of the natural teeth of one person will vary from the pearlescent effect of the natural teeth of another person. Such effect may be somewhat of a spotty nature as distinguished from what appears to be a transverse band or stripe, for example, as shown in FIG. 1. A typical spotty type of pattern is illustrated in exemplary manner in the embodiment shown in FIGS. 4–6. It is to be understood that the body and enamel-simulating portions 10 and 14 of the embodiment shown in FIGS. 4–6 are substantially the same as those in the embodiment shown in FIGS. 1–3. Accordingly, similar reference characters are used in regard to similar parts.

To produce the spotty effect illustrated in the embodiment shown in FIGS. 4–6, there is disposed between the interface surfaces 22 and 24 of the body part 10 and enamel-simulating part 14, a somewhat heterogeneous and irregularly arranged series of preferably flake-like pieces of mica 28 which, when the body and enamel-simulating parts of the tooth are placed in overlying relationship and are united to form the completed tooth, the material of said parts readily will accommodate the flakes of mica 28 therebetween and also conform said flakes to the irregular cross-sectional shape of the interface surfaces 22 and 24, as in regard to the embodiment illustrated in FIGS. 1–3 and described hereinabove. The flakes may be positioned, for example, by the technique described hereinabove relative to FIGS. 1–3.

For purposes of producing still other pearlescent effects, especially in regard to the shapes of the reflective areas, attention now is directed to FIGS. 7–9 in which still further shapes of areas of thin bits or pieces of mica are utilized to produce correspondingly different effects. In this regard, it will be seen in FIG. 7, that the stripe-like arrangement of mica 30 has oppositely curving upper and lower edges 32 and 34, for example, within the general plane of such stripe. Such curves preferably are not particularly smooth, however, so as to produce a desired irregular effect. It also will be understood that the thin stripe of mica 30 is disposed between the interfaces of the respective body and enamel-simulating parts in a manner similar to that described in preceding embodiments. All of the designated portions of the body and enamel-simulating parts of the tooth shown in FIG. 7 have reference characters corresponding to those in the preceding embodiments.

Considering next the embodiment shown in FIG. 8, it will be seen that a plurality of transversely spaced and preferably longitudinally elongated areas of thin mica 36 are disposed between the interfaces of the body and enamel-simulating parts of the tooth, such areas being formed and applied as in accordance with the preceding embodiments. Preferably, the areas 36 respectively are somewhat different in contour as well as in length and width, although generally they are of an elongated nature. The longest dimension of each piece preferably is disposed generally parallel to the longitudinal axis of the tooth. It thus can be realized that the pearlescent effect produced by such spaced pieces or areas of light-reflecting material 36 will be substantially different from the reflective patterns resulting from the arrangements of light-reflecting material in the preceding embodiments.

In FIG. 9, a still different arrangement of light-reflecting material is provided in the form of a pair of relatively narrow, transversely extending stripes of mica 38 and 40. In this embodiment, as in the preceding embodiments, the areas of mica preferably are relatively thin and readily are formed and applied as described relative to the preceding embodiments, whereby said areas are susceptible to faithfully assuming the shape of the irregular interfaces between the body and enamel-simulating parts of the composite tooth. In FIG. 9, it will be seen that the areas or stripes 38 and 40 are of light-reflecting material, such as mica, which are disposed generally transversely across the tooth between the opposite side edges thereof but in vertically spaced relationship and more or less parallel to each other. As a result, the type of pattern produced by such light-reflective material is still different from that which is produced by the preceding embodiments.

In FIGS. 10 and 11, a somewhat different basic structure is provided from that utilized in the preceding embodiments. Referring particularly to FIG. 11, it will be seen that the body part 10 is similar to the body parts in the preceding embodiments. However, rather than employ a single layer of enamel-simulating material, a plurality of such layers, at least partially overlying each other, as well as the innermost layer overlying the forward face of the body part 10, are utilized. From FIG. 11, it will thus be seen that what will be termed an inner enamel-simulating layer 42 is formed by suitable mold means generally of the type described above. It then is united in overlying manner with the body part 10 by procedures of the type generally described above, after first inserting a narrow, thin stripe 48 of light-reflective material such as mica therebetween substantially within the "gingival third" of the tooth.

In addition to the inner enamel-simulating layer 42, a second, outer enamel-simulating layer 50 is formed by appropriate mold means of the type generally referred to hereinabove and subsequently is united in overlying relationship with the outer surface of inner enamel-simulating layer 42. Prior to such uniting of the layer 50 with layer 42 however, a second area or stripe of light-reflecting material 52 is disposed between said two enamel-simulating layers so as to extend in a generally transverse direction, as shown in FIG. 10. Also, preferably the stripe of material 52 is at least partially out of registry with the stripe 48 both in a direction perpendicular to the general plane of the tooth as well as in a direction parallel to the longitudinal axis of the tooth, as readily can be seen from both FIGS. 10 and 11.

In accordance with the above-described principles of the present invention, the areas or stripes of light-reflective material 48 and 52 both may be formed in the manner described above relative to the preceding figures. Said areas of material respectively are disposed between the interfaces formed between body part 10 and inner enamel-simulating layer 42 with regard to stripe 48 and between the inner and outer enamel-simulating layer 42 with regard to stripe 48 and between the inner and outer enamel-simulating layers 42 and 50 with respect to stripe 52. The layers 42 and 50 readily conform themselves to accommodate the slight additional thickness of the areas or stripes 48 and 52. Also, due to the at least semi-translucent nature of the enamel-simulating layers 42 and 50, the light-reflecting and refracting properties of the areas or stripes 48 and 52 readily may be observed through the enamel-simulating layer so as to produce a highly realistic pearlescent effect closely resembling the similar effect present in natural teeth which is evident when reflecting incident light.

In addition to using mica as the light-reflecting material to produce the above-described pearlescent effect in artificial ceramic teeth, it also is possible to produce such effects by the use of glass-like material. For example, glass or glass-like material of inherent high-fusing characteristic, at least higher than the feldspathic matrix, and having a suitable index of refraction sufficiently different from that of the ceramic matrix material, for example, of the body and enamel-simulating parts to produce the desired effects of the invention described above, may be formed into very thin sheets, and then broken into pieces of various shapes and sizes. By mixing a quantity of such pieces in a suitable vehicle such as glycerin, or a suitable commercial-type ceramic bending or lining media, various pattern configurations of said glass-like material may be applied in the form of very thin coating, either band-like, or in separated areas upon the inner surface of either the enamel-simulating layer on the body part. The application of said material, in suitable configurations and shapes, to said inner surface of such layer or part occurs after the same has been preformed and prior to applying said layer and body part 10 to each other.

The ceramic "dough" from which the body part and enamel-simulating part or parts described above are formed preferably is still in plastic condition when the foregoing occurs, whereby the body part 10 and the enamel-simulating layer or parts 14, 42 and/or 50, when united, than may be processed in accordance with conventional techniques for finalizing the manufacturing of ceramic artificial teeth, which final step entails firing the precisely shaped composite teeth at vitrifying temperatures within the customary approximate ranges specified above.

All of the various types of light-reflecting material described hereinabove and claimed hereinafter for producing the pearlescent effect within ceramic artificial teeth readily are capable of withstanding said vitrifying temperatures without impairing in any way the particular reflective properties thereof which produce such pearlescent effect by appropriately reflecting incident light due to the index of refraction of said light-reflective material being sufficiently different from the ceramic matrix material as to cause partial reflection and refraction of such incident light and thereby simulating said pearlescent effect of natural teeth.

I claim:

1. An artificial ceramic tooth formed from at least two parts comprising respectively a relatively opaque ceramic inner body part and an outer translucent ceramic enamel-simulating part having complementary interface surfaces and integrally connected together, said tooth having a restricted area adjacent the incisal edge or occlusal surface which is visible through said outer translucent part on the labial surface of said tooth, said restricted area comprising a substantially continuous irregular band of very small flake-like platelets of mica interposed between the interface surfaces of said connected parts and extending transversely across the body part of said tooth for substantially the full width thereof and positioned closer to the incisal edge or occlusal surface than it is to the gingival end of the tooth, the width of said band being substantially less than half the length of said tooth, and said mica platelets being semi-translucent and semi-reflective and simulating the pearlescent effect of a natural tooth when light is reflected thereby due to said mica only partially reflecting incident light without excessive scattering and difusion thereof.

2. The artificial ceramic tooth according to claim 1 in which the flakes of said mica are disposed heterogeneously in said band-like area thereof and said layer being of irregular width.

3. The artificial ceramic tooth according to claim 1 in which said band of platelets is discontinuous and comprises a plurality of separated areas of said material.

4. The artificial ceramic tooth according to claim 3 in which said separated areas are spaced transversely and longitudinally in directions substantially parallel to the general plane of the tooth.

5. The artificial ceramic tooth according to claim 1 in which said tooth comprises a plurality of enamel-simulating parts respectively overlying each other and said body part and extending longitudinally of said tooth, and said tooth having a plurality of said bands of platelets of restricted area interposed respectively between the interfaces of said enamel-simulating parts and said body part and complementary in shape thereto, said bands also being out of registry with each other.

6. An artificial ceramic tooth formed from at least two parts comprising respectively a relatively opaque ceramic inner body part and an outer translucent ceramic enamel-simulating part having complementary interface surfaces and integrally connected together, said tooth having a restricted area adjacent the incisal edge or occlusal surface which is visible through said outer translucent part on the labial surface of said tooth, said restricted area comprising a substantially continuous irregular band of very small flake-like platelets of glass capable of withstanding the firing temperature of said ceramic material from which said tooth parts are formed interposed between the interface surfaces of said connected parts and extending transversely across the body part of said tooth for substantially the full width thereof and positioned closer to the incisal edge or occlusal surface than it is to the gingival end of the tooth, the width of said band being substantially less than half the length of said tooth, and said glass platelets being semi-translucent and semi-reflective and simulating the pearlescent effect of a natural tooth when light is reflected thereby due to said glass only partially reflecting incident light without excessive scattering and diffusion thereof.

7. The artificial ceramic tooth according to claim 6 in which the flakes of said glass are disposed heterogeneously in said band-like area thereof and said layer being of irregular width.

8. The artificial ceramic tooth according to claim 6 in which said band of platelets is discontinuous and comprises a plurality of separated areas of said material.

9. The artificial ceramic tooth according to claim 8 in which said separated areas are spaced transversely and longitudinally in directions substantially parallel to the general plane of the tooth.

10. The artificial ceramic tooth according to claim 6 in which said tooth comprises a plurality of enamel-simulating parts respectively overlying each other and said body part and extending longitudinally of said tooth, and said tooth having a plurality of said bands of platelets of restricted area interposed respectively between the interfaces of said enamel-simulating parts and said body part and complementary in shape thereto, said bands also being out of registry with each other.

References Cited

UNITED STATES PATENTS

| 2,793,436 | 5/1957 | Gotlib | 32—8 |
| 2,230,164 | 1/1941 | Myerson | 32—8 X |
| 3,218,711 | 11/1965 | Connan | 32—8 |

FOREIGN PATENTS

| 899,309 | 8/1944 | France. |
| 387,474 | 5/1963 | Japan. |

ROBERT PESHOCK, *Primary Examiner.*